(12) United States Patent
Gopal

(10) Patent No.: US 12,536,556 B2
(45) Date of Patent: Jan. 27, 2026

(54) SMART LISTING CREATION BASED ON MACHINE-LEARNING ANALYSIS

(71) Applicant: eBay Inc., San Jose, CA (US)

(72) Inventor: SenthilKumar Gopal, Fremont, CA (US)

(73) Assignee: EBAY INC., San Jose, CA (US)

(*) Notice: Subject to any disclaimer, the term of this patent is extended or adjusted under 35 U.S.C. 154(b) by 184 days.

(21) Appl. No.: 18/105,483

(22) Filed: Feb. 3, 2023

(65) Prior Publication Data
US 2024/0265412 A1 Aug. 8, 2024

(51) Int. Cl.
*G06Q 10/00* (2023.01)
*G06N 5/022* (2023.01)
*G06Q 10/087* (2023.01)
*G06Q 30/0202* (2023.01)

(52) U.S. Cl.
CPC ......... *G06Q 30/0202* (2013.01); *G06N 5/022* (2013.01); *G06Q 10/087* (2013.01)

(58) Field of Classification Search
None
See application file for complete search history.

(56) References Cited

U.S. PATENT DOCUMENTS

| | | | |
|---|---|---|---|
| 9,727,616 B2 | 8/2017 | Wu et al. | |
| 10,977,707 B2* | 4/2021 | Kumaresan Nair | G06Q 30/0631 |
| 11,475,402 B1* | 10/2022 | Hum | G06Q 10/087 |
| 11,514,506 B2 | 11/2022 | Singh et al. | |
| 2015/0134498 A1* | 5/2015 | Patel | G06Q 10/087 705/28 |
| 2017/0220943 A1* | 8/2017 | Duncan | G06F 8/38 |
| 2017/0286901 A1* | 10/2017 | Skaff | G06V 10/751 |
| 2018/0046971 A1* | 2/2018 | Helander | G06Q 10/087 |
| 2018/0046974 A1* | 2/2018 | Helander | G06Q 10/087 |

(Continued)

OTHER PUBLICATIONS

Silva, Fernando, Accurately predicting future sales at Clearly using Amazon Forecast, Aug. 9, 2021, AWS, https://aws.amazon.com/blogs/machine-learning/accurately-predicting-future-sales-at-clearly-using-amazon-forecast/, p. 1-4. (Year: 2021).*

(Continued)

*Primary Examiner* — Joseph M Waesco
(74) *Attorney, Agent, or Firm* — SCHWEGAN LUNDBERG & WOESSNER, P.A.

(57) ABSTRACT

Systems and methods are directed to automatic listing generation and inventory management based on machine-learning analysis. The system trains a time series-based machine learning (ML) model that forecasts sales. During inference time, the system determines one or more potential categories for a user based on custom preferences and previous analytic queries of the user. High demand items in the one or more potential categories are then applied to the ML model, which outputs probabilities of predicted sales for the high demand items. The system then determines items having a potential inventory gap by cross-checking current inventory with items having a probability outputted by the ML model that satisfies a probability threshold. For each item that satisfies the probability threshold, competitor sales data, predicted sales data derived from the ML model, and editable fields displaying automatic listing thresholds that trigger the automatic generation of a corresponding listing are presented in a user interface.

20 Claims, 11 Drawing Sheets

(56) References Cited

U.S. PATENT DOCUMENTS

| | | | |
|---|---|---|---|
| 2020/0117884 A1* | 4/2020 | Adato | G06T 7/20 |
| 2020/0151743 A1 | 5/2020 | Acriche et al. | |
| 2021/0406988 A1 | 12/2021 | Oh et al. | |
| 2022/0129935 A1 | 4/2022 | Sudhindra et al. | |
| 2022/0237688 A1* | 7/2022 | Teh | G06Q 40/04 |
| 2022/0327468 A1* | 10/2022 | Donnels | G06Q 10/087 |
| 2022/0374805 A1 | 11/2022 | Zhang et al. | |
| 2023/0245152 A1* | 8/2023 | Zhu | G06Q 30/0202 |
| | | | 705/7.34 |

OTHER PUBLICATIONS

Duffhues, G. S., "Demand Prediction for a Lost Sales Inventory System In E Commerce", Eindhoven University of Technology, (Sep. 2017), 76 pgs.

Ziegler, Philip, "Machine Learning for Inventory Management", Aalto University School of Business, (2020), 92 pgs.

* cited by examiner

| PRODUCT NAME 702 | AVE SALE $ 704 | INVENTORY VOLUME 706 | PREDICTED SALE $ 708 | PREDICTED SALE VOLUME 710 | PRICE MARGIN 712 | INVENTORY COUNT 714 | SELLER OPT-IN 716 |
|---|---|---|---|---|---|---|---|
| PRODUCT 1 | $100 | 45K | $93 | 75K | ◀ 4% ▶ | ◀ 20K ▶ | ●AUTO ○MANUAL |
| PRODUCT 2 | $50 | 300K | $49 | 876K | ◀ 3% ▶ | ◀ 300K ▶ | ○AUTO ●MANUAL |

SMART LISTING CREATION BASED ON MACHINE-LEARNING ANALYSIS

TECHNICAL FIELD

The subject matter disclosed herein generally relates to automatic listing creation. Specifically, the present disclosure addresses systems and methods that automatically generate listings at an appropriate time based on machine-learning forecasted demand and current active listings.

BACKGROUND

Users typically need to perform painstaking research to identify sale opportunities for their preferred category of products. These users may also pay third parties that mine data to provide demand forecasts for insights. However, there is no streamlined mechanism for a user to automatically identify upcoming seasonality trends, price changes, and demands and automatically create listings to help drive early sales. Users typically stock their inventory before creating these listings, which delays their ability to capture early market share. These delays also allow competitors to reach early customers and gain better conversion.

BRIEF DESCRIPTION OF THE DRAWINGS

FIG. 7 illustrates a dashboard user interface providing potential sales opportunities and including adjustable listing thresholds that trigger automatic listing creation, according to example embodiments.

DETAILED DESCRIPTION

Figure 1:
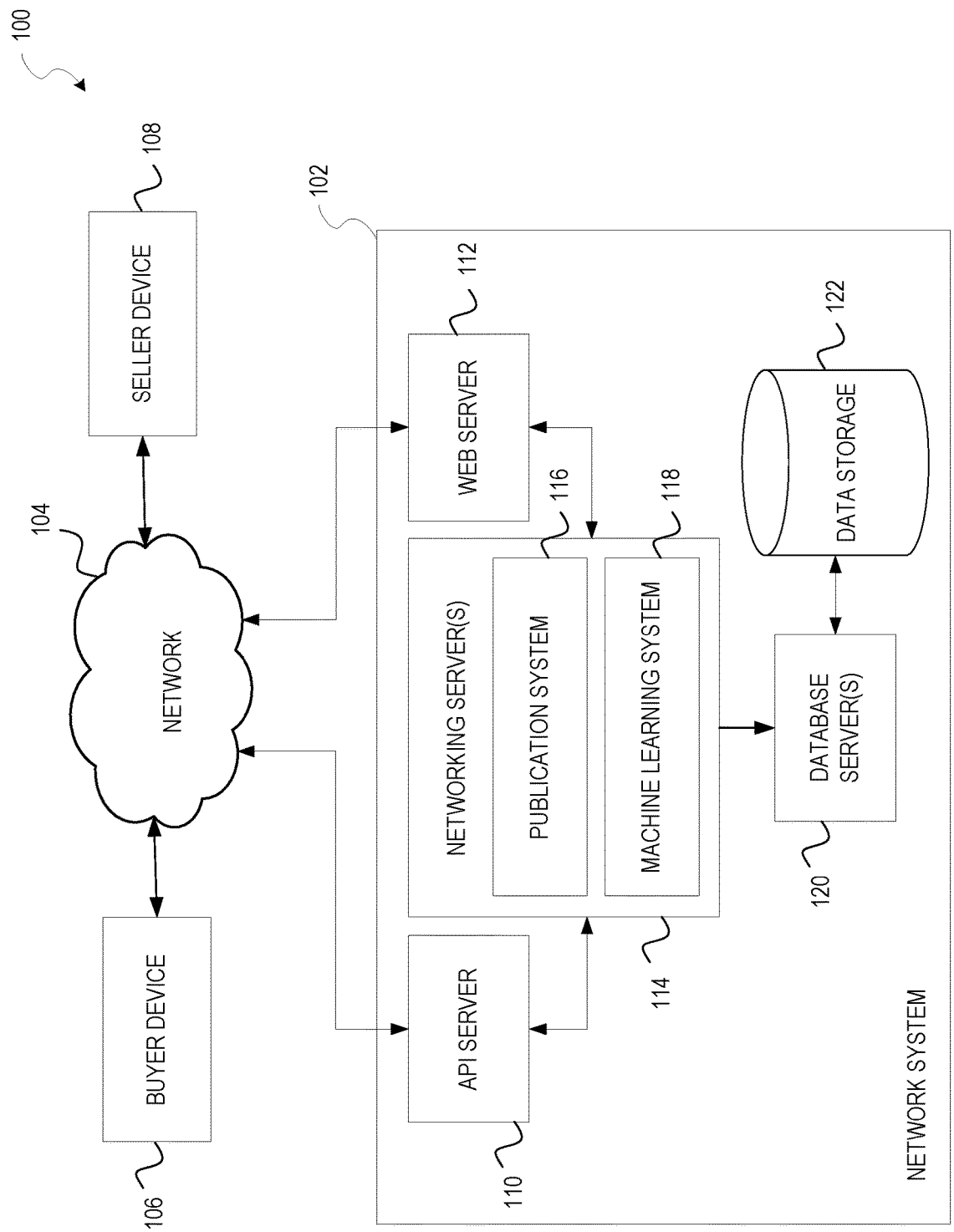
FIG. 1 is a diagram illustrating an example network environment suitable for automatic listing generation and inventory management based on machine-learning analysis, according to example embodiments.

The description that follows describes systems, methods, techniques, instruction sequences, and computing machine program products that illustrate examples of the present subject matter. In the following description, for purposes of explanation, numerous specific details are set forth in order to provide an understanding of various examples of the present subject matter. It will be evident, however, to those skilled in the art, that examples of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Systems and methods that machine-train (e.g., using machine-learning) a forecasting model that forecasts or predicts future sales and apply the forecasting model to specific categories of items derived for actions associated with a user (e.g., seller) are discussed herein. The specific categories are derived by analyzing the user's previous sales, current inventory, previous analytic queries, and any custom preferences. Once the categories are identified, high demand items in these categories are determined based on historical (e.g., sales data for last 5 years which can be extended for a larger window) and current buyer demand (e.g., based on recent 30 days of sales) and day-to-day search traffic. The high demand items in the categories along with an adjustable prediction timeframe (e.g., up to 30 days in the future) are applied to the forecasting model which outputs probabilities of predicted sales for the different items. Items with probabilities that satisfy (e.g., meets or transgresses) a probability threshold are then cross-checked with current active listings (e.g., current inventory) to determine any potential inventory gaps. A dashboard can be presented on a user interface that displays, for each item having an inventory gap, competitor data, predicted data from the forecasting model, and editable fields indicating listing thresholds that trigger the automatic generation of a listing. In example embodiments, the items recommended to the user comprises items that the user may not have sold in the past.

The machine training of the forecasting model involves training on data from past transaction histories. In some embodiments, the forecasting model is built using a Long Short-Term Memory (LSTM) based model which is trained to predict a next sequence of events. The input data is derived by windowing time series data based on timestamps of each past transaction. Because transactions are continually occurring, new transactions can be used to retrain/refine the forecasting model. Thus, the forecasting model can be continuously refined and improved (e.g., on a daily or weekly basis) to account for ongoing trends (e.g., increased/decrease in sales, increased/decrease in search traffic).

Example embodiments address the technical problem of automatically generating listings (e.g., generating specific formatted data) and automatically publishing the listing at an appropriate time. The listings are automatically generated and published on behalf of a user (e.g., seller) for items the user may have shown an interest in selling but may not have sold in the past. The technical solutions predict, using a machine-trained forecasting model, sale probabilities for items in categories of interest of the user. Based on the probabilities, the system can determine if an inventory gap exists in current inventory available and can present a dashboard with competitor sales data, predicted sales data derived from the forecasting model, and editable fields displaying automatic listing thresholds that trigger the automatic generation of a corresponding listing. Thus, the user does not need to painstakingly research sale opportunities for their preferred categories/items or identify upcoming seasonality trends, price changes, and demands. As a result, one or more of the methodologies described herein may obviate a need for certain efforts or computing resources that otherwise would be involved in performing analytic research by the user and manual creation and publication of the listings. Examples of such computing resources include processor cycles, network traffic, memory usage, data storage capacity, power consumption, network bandwidth, and cooling capacity FIG. 1 is a diagram illustrating an example network environment 100 suitable for smart automatic listing generation and inventory management based on machine-learning analysis, according to example embodiments. A network system 102 provides server-side functionality via a communication network 104 (e.g., the Internet, wireless network, cellular network, or a Wide Area Network (WAN)) to a buyer device 106 and a seller device 108. The network system 102 machine-trains a forecasting model using transaction histories and, during inference time, applies the forecasting model to predict high demand items in derived categories associated with a seller to determine probabilities for predicted sales of the different items in categories of interest to a user, as will be discussed in more detail below.

In various cases, the buyer device 106 is a device associated with the user account of a potential buyer of the network system 102 that is searching for and purchasing items via the network system 102 during an online session, while the seller device 108 is a device associated with a seller account (e.g., a seller of one or more items) of the network system 102. The seller account can generate and publish listings for one or more items via the network system 102 as will be discussed in more detail below.

The buyer device 106 and the seller device 108 interface with the network system 102 via a connection with the network 104. Depending on the form of the buyer device 106 and the seller device 108, any of a variety of types of connections and networks 104 may be used. For example, the connection may be Code Division Multiple Access (CDMA) connection, a Global System for Mobile communications (GSM) connection, or another type of cellular connection. Such a connection may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, or other data transfer technology (e.g., fourth generation wireless, 4G networks, 5G networks). When such technology is employed, the network 104 includes a cellular network that has a plurality of cell sites of overlapping geographic coverage, interconnected by cellular telephone exchanges. These cellular telephone exchanges are coupled to a network backbone (e.g., the public switched telephone network (PSTN), a packet-switched data network, or other types of networks.

In another example, the connection to the network 104 is a Wireless Fidelity (Wi-Fi, IEEE 802.11x type) connection, a Worldwide Interoperability for Microwave Access (WiMAX) connection, or another type of wireless data connection. In such an example, the network 104 includes one or more wireless access points coupled to a local area network (LAN), a wide area network (WAN), the Internet, or another packet-switched data network. In yet another example, the connection to the network 104 is a wired connection (e.g., an Ethernet link) and the network 104 is a LAN, a WAN, the Internet, or another packet-switched data network. Accordingly, a variety of different configurations are expressly contemplated.

The buyer device 106 and the seller device 108 may comprise, but are not limited to, a smartphone, tablet, laptop, multi-processor systems, microprocessor-based or programmable consumer electronics, game consoles, set-top boxes, a server, or any other communication device that can access the network system 102. The buyer device 106 and seller device 108 may comprise a display module (not shown) to display information (e.g., in the form of user interfaces). The buyer device 106 and/or the seller device 108 can be operated by a human user and/or a machine user.

Turning specifically to the network system 102, an application programing interface (API) server 110 and a web server 112 are coupled to, and provide programmatic and web interfaces respectively to, one or more networking servers 114. The networking server(s) 114 host a publication system 116 and a machine learning system 118, each of which comprises a plurality of components, and each of which can be embodied as hardware, software, firmware, or any combination thereof. The publication system 116 will be discussed in more detail in connection with FIG. 2 and the machine learning system 118 will be discussed in more detail in connection with FIG. 3.

The networking servers 114 are, in turn, coupled to one or more database servers 120 that facilitate access to one or more storage repositories or data storage 122. The data storage 122 is a storage device storing, for example, transaction histories and user accounts (e.g., profiles associated with a buyer or seller). Additionally or alternatively, the data storage 122 is a storage device that can store a machine-trained forecasting model (or a version of the machine-trained forecasting model).

Any of the systems, servers, data storage, or devices (collectively referred to as "components") shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 11, and such a special-purpose computer is a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any two or more of the components illustrated in FIG. 1 may be combined, and the functions described herein for any single component may be subdivided among multiple components. Functionalities of one system may, in alternative examples, be embodied in a different system. For example, some functionalities of the publication system 116 may be embodied in the machine learning system 118 and/or vice-versa. Additionally, any number of buyer devices 106, seller devices 108, or data storage 122 may be embodied within the network environment 100. While only a single network system 102 is shown, alternatively, more than one network system 102 can be included (e.g., localized to a particular region).

Figure 2:
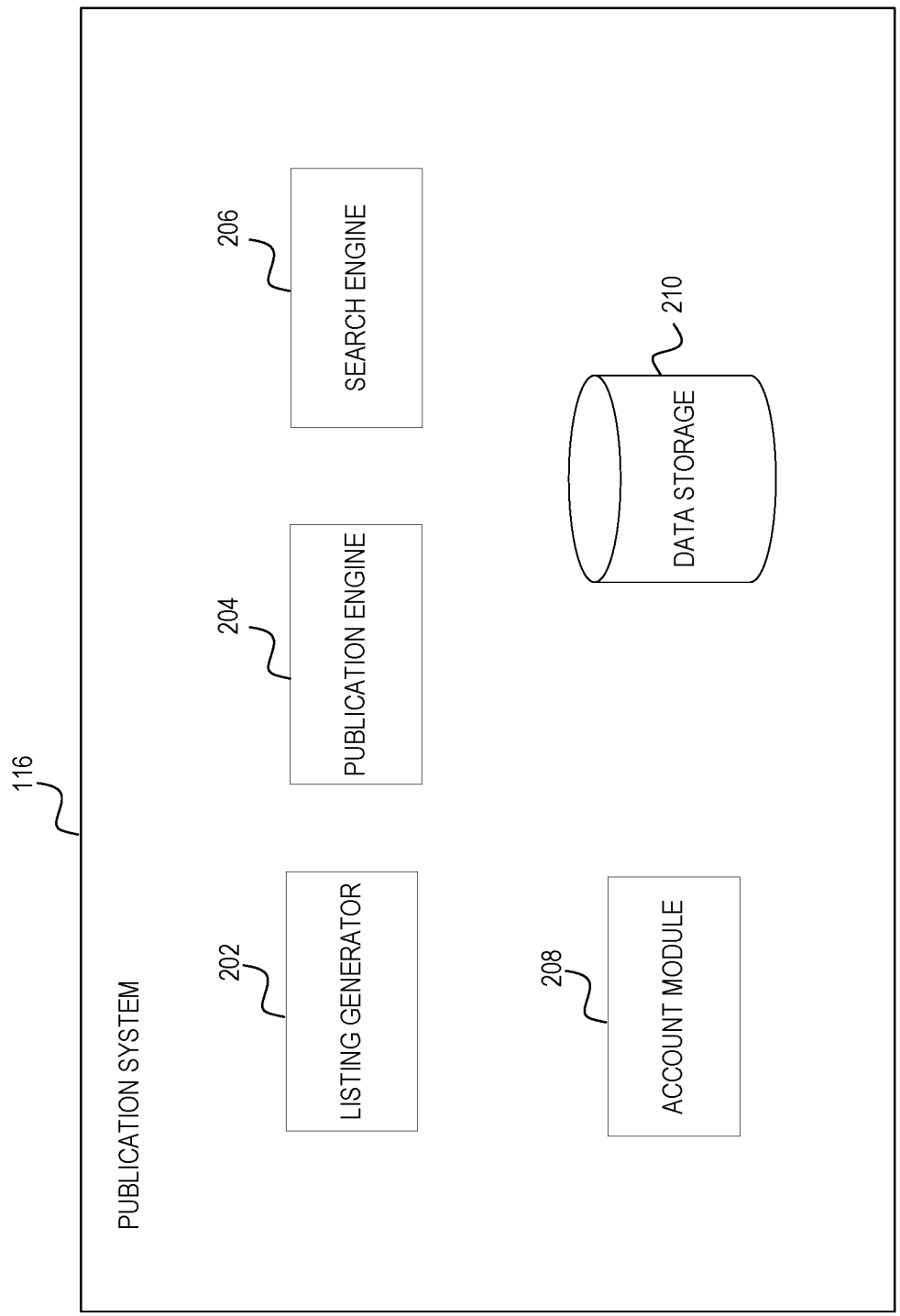
FIG. 2 is a diagram illustrating components of a publication system, according to example embodiments.

FIG. 2 is a diagram illustrating components of the publication system 116, according to example embodiments. The publication system 116 is configured to manage listings and transactions at the network system 102 including generating and publishing listings, conducting searches for listings, conducting analytic queries, and maintaining user accounts. To enable these operations, the publication system 116 comprises a listing generator 202, a publication engine 204, a search engine 206, an account module 208, and a data storage 210 all configured to communication with one another (e.g., via a bus, shared memory, or a switch). In some embodiments, the publication system 116 may also include or be coupled to a payment system to process payments and/or a shipping engine to manage shipping of items purchased via the network system 102.

The listing generator 202 is configured to automatically generate listings. In example embodiments, the listing generator 202 is triggered by the machine learning system 118 to automatically generate listings based on automatic listing thresholds determined (or managed) by the machine learning system 118, as will be discussed in more detail below. In generating the listing, the listing generator 202 may access data for a seller of the item and access a catalog that contains listing information for the item (e.g., dimensions, weight, color, general description). A price for the listing is obtained from the machine-learning system 118 and is based, in one example, on an average price the item is selling for in current inventory and a price margin acceptable to the seller, as will be discussed in more detail below.

Once generated, the listings are published by the publication engine 204 to an electronic marketplace. For example, the publication engine 204 can host a marketplace application that provides a number of marketplace functions and services to users, whereby the seller may list (or publish information concerning) goods or services (collectively referred to as "items") for sale. In some embodiments, the publication engine 204 publishes automatically generated listings at an appropriate time. For example, if the machine learning system 118 determines that demand for a particular item will be high next week, the listing can be automatically generated ahead of time, approved by the seller (if needed), and automatically published next week.

The search engine 206 is configured to conduct searches of published listings in the marketplace. Accordingly, potential buyers can provide search terms or browse through categories of items using their buyer device 106. The searches performed by the potential buyers comprises search traffic that will be used (e.g., during inference time) to identify top items in potential categories to apply to the forecasting model as will be discussed in more detail below. In various embodiments, records of the buyer searches can be stored to the data storage 122 or 210.

The search engine 206 is also configured to conduct analytic queries from sellers. For example, a seller may perform queries to research and identify sale opportunities for preferred categories or categories of interest for future sales. These queries are tracked and later used in determining potential categories for the seller, as will be discussed in more detail below. In various embodiments, records of the seller analytic queries can be stored to the data storage 122 or 210.

The account module 208 is configured to manage user accounts in the network system 102. As such, the account module 208 can maintain and update data associated with each user account by storing the data to the data storage (e.g., storage 122 or 210). In example embodiments, the user account for a seller can include data regarding past sale transactions, past analytic queries, current inventory, and any preferences of the seller. The preferences of the seller can include, for example, categories or items within categories that the seller prefers to sell, categories or items within categories the seller does not want to sell, and a preferred price margin for an item or category. The account module 208 can also access the account data from the database 122 or 210 when needed.

Figure 3:
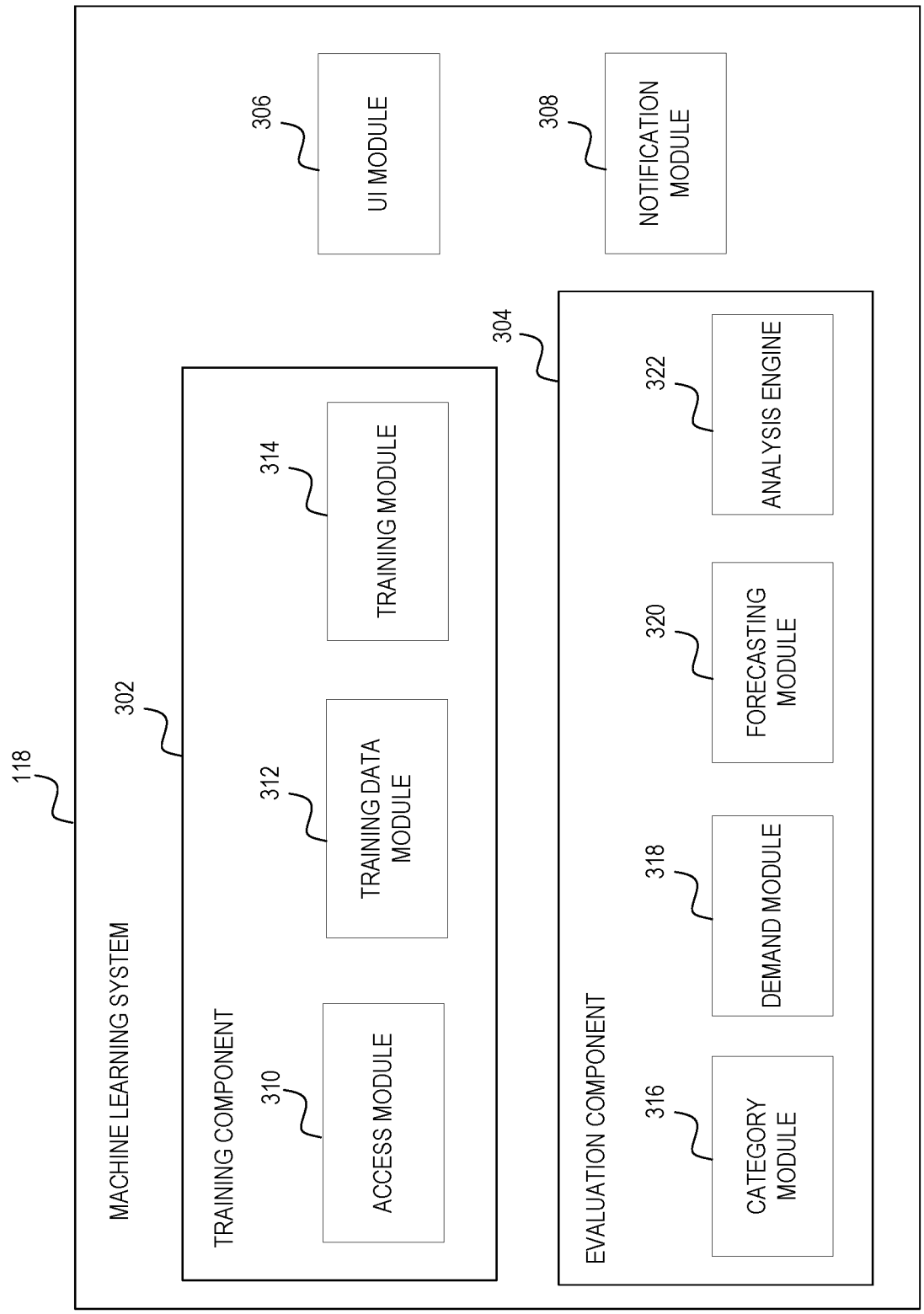
FIG. 3 is a diagram illustrating components of a machine learning system, according to example embodiments.

FIG. 3 is a is a diagram illustrating components of an example machine learning system 118, according to example embodiments. The machine learning system 118 is configured to train the forecasting model and refine the forecasting model by retraining with updated training data. During inference time, the machine learning system 118 uses the trained forecasting model to determine probabilities of predicted sales for different items in various categories of interest to a seller. The machine learning system 118 then determines inventory gaps for items with probabilities that satisfy a probability threshold and generates a dashboard for the seller that can be used to set up automatic generation and publication of listings.

To enable these operations, the machine learning system 118 includes a training component 302, an evaluation component 304, a user interface (UI) module 306, and a notification module 308 all configured to communicate with each other (e.g., via a bus, shared memory, or a switch). While FIG. 3 shows the training component 302 and the evaluation component 304 being embodied within the machine learning system 118, alternatively, the training component 302 can be separate from the evaluation component 304 in a different system or server. For example, the evaluation component 304 may be a part of the publication system 116.

In example embodiments, the training component 302 trains the forecasting model using training data derived from past transactions that occurred via the network system 102 (e.g., facilitated by the publication system 116). The machine learning can occur using an artificial neural network. In one embodiment, the forecasting model is built using a Long Short-Term Memory (LSTM) based model which is trained to predict a next sequence of events. In alternative embodiments, the machine learning can occur using other mechanisms such as, for example, standard Tree based models (XGBoost) or embedding based models, linear regression, logistic regression, a decision tree, k-nearest neighbors, and/or k-means. The training component 302 can comprise an access module 310, a training data module 312, and a training module 314.

The access module 310 accesses a data storage (e.g., data storage 122 or 210) that stores past transactions. The access module 310 may identify and group past transactions, for example, based on item categories; item types, and/or time frame. The access module 310 can thus select the types or groups of past transactions used to train the forecasting model. As such, the access module 310 can, in some embodiments, operate as a filter to select the past transactions from which features will be extracted to train the forecasting model.

The training data module 312 is configured to extract training data from the past transactions and structure the training data for input to the training module 314. The training data module 312 structures the training data by windowing time series data based on timestamps of each transaction. In one embodiment, the time series events are windowed at a daily rate.

Figure 4:
FIG. 4 is a diagram illustrating a structure of sample training data, according to example embodiments.

Referring to FIG. 4, a diagram illustrating a structure of sample training data is shown. In example embodiments, the training data is structured into a table 400 that includes, for each row, a date, a week identifier, a month identifier, a product identifier for an item, a sales count for the item, and an average price for the item. In some cases, the product identifier can be replaced with a title and/or image of the item sold for an embedding representation to improve a predictive power of the forecasting model and expand the training to predict over a cluster of products instead of a single product identifier. While only two rows are shown in the table 400 for illustrative purposes, any number of rows may be embodied within the table 400. Further still, more data or less data may be included in the training data. For instance, the week identifier and/or month identifier may not be included.

Additionally, while example embodiments are discussed as windowing time series events on a daily rate, alternative embodiments can train with other time intervals (e.g., every 12 hours, every hour). Additionally, by training (retraining) more frequently, the forecasting model is more up-to-date and able to capture trends as they occur. The training data is then passed to the training module 314.

Referring back to FIG. 3, the training module 314 trains the forecasting model using, for example, neural networks (e.g., LSTM) using the training data extracted and structured by the training data module 312. The training of the forecasting model may include training for probabilities for types of items selling in the network system 102. In one embodiment, the forecasting model is built using a Long Short-Term Memory (LSTM) based model which is trained to predict a next sequence of events.

In example embodiments, the training data can comprise a last number of years where a larger portion of the training data is used for training the forecasting model and a smaller portion of the training data is used for prediction validation. For example, the training data can be for the last five years, whereby the first 4.5 years of the training data can be used to train the forecasting model and the last six months of training data can be used for validating the predictions.

In example embodiments, the training module 314 performs the validation after training the model. The validation data (e.g., the last six months of training data) is used to verify the predictive performance of the forecasting model against the ground truth of sales data available for the six month validation data. This allows for verifying the generalization and the prediction accuracy of the forecasting model and can help tune any further hyperparameters as needed. While six months of validation data is discussed, alternative embodiments may use any length of validation data.

The forecasting model is used to predict the sale_count and avg_price for a predetermined set of products whose sale information is available from the validation period. Then, the predictions and the actual sale data are cross-verified to determine the predictive power of the forecasting model. In one embodiment, this is calculated as mean squared error of the sale_count and avg_price difference. However, other loss functions can be used based on effectiveness of predictions for model training. A low error threshold is used to identify if the forecasting model has been trained enough to generalize for future predictions.

Some categories have very low sales volume in comparison to other categories due to various reasons such as, for example, being a low inventory category (e.g., collector items) or being a high price category (e.g., fine jewelry). Such categories are excluded (e.g., by the training data module 312) from training the forecasting model until enough training data and model metric thresholds are obtained.

While example embodiments discuss training the forecasting model using recurring neural network-Long Short-Term Memory (RNN-LSTM), alternative embodiments may utilize other mechanisms. For example, the RNN-LSTM can be replaced with standard tree-bases models (e.g., XGBoost) or embedding-based models (e.g., Time2Vec) to improve model performance.

During runtime or inference time, the evaluation component 304 of the machine learning system 118 is configured to determine forecasts of sales for various items that a seller may be interested in selling (or is currently selling). More specifically, the evaluation component 304 determines probabilities of predicted sales for high demand items in categories or items of interest for the seller. To perform these operations, the evaluation component 304 comprises a category module 316, a demand module 318, a forecasting module 320, and an analysis engine 322.

The category module 316 is configured to determine one or more potential categories of interest for a seller for which the machine learning system 118 will perform analysis to identify items with a high probability of future sales. In example embodiments, the category module 316 accesses user account data for a seller (e.g., profile or account history associated with the user account stored in the data storage 122 or 210) and determines current inventory of the seller (e.g., what the seller has currently listed by the publication system 116), previous analytic queries performed by the seller, previous sales transactions, and any preferences of the seller. The previous analytic queries are queries performed by the seller to research and identify sale opportunities for various categories or items. The preferences of the seller can include, for example, categories or items within categories that the seller prefers to sell, categories or items within categories the seller does not want to sell, and a preferred price margin for an item or category. In example embodiments, the category module 316 uses heuristics to identify preferred categories (or leaf categories) of the seller.

The demand module 318 determines high demand items in the seller preferred categories that will be applied to the forecasting model. In example embodiments, the demand module 318 accesses recent buyer demand data and search traffic. The buyer demand data comprises aggregated data of recent (e.g., last 30 days) item sales. This helps identify any recent surges in item needs and helps filter key items to be forecasted for sales. The search traffic allows identifying recent search queries (e.g., last 30 days) and their corresponding items to ensure highly searched for items are being forecasted for. Using the buyer demand data and the search traffic, the demand module 318 determines high demand items in the potential categories identified by the category module 316.

The high demand items for the potential categories of the seller are then passed to the forecasting module 320, which applies the high demand items to the forecasting model. The forecasting model outputs probabilities of predicted sales for the different high demand items of each potential category.

Figure 5:
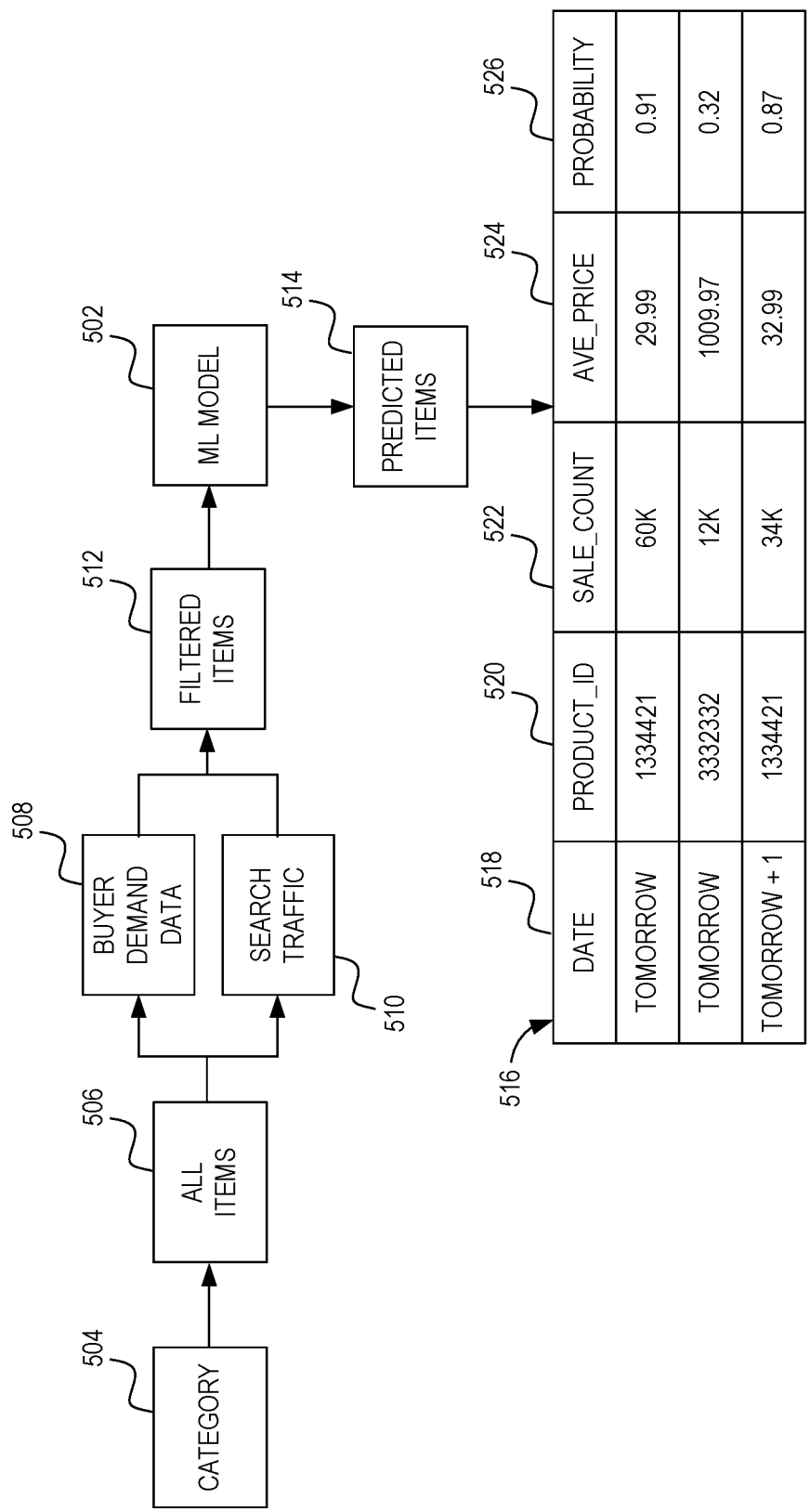
FIG. 5 is a diagram illustrating an application of the machine-learning model to predict demand, according to example embodiments.

Referring now to FIG. 5, a diagram illustrating an application of the machine-learning forecasting model 502 to predict demand is shown. At inference time, each preferred category 504 identified by the category module 316 comprises one or more items. All of these items (all items 506) are filtered by the demand module 318. Specifically, the demand module 318 determines high demand items in the seller preferred categories based on recent buyer demand data 508 and search traffic 510.

The list of one or more high demand items (filtered items 512) is then passed to the forecasting module 320 which applies the list of the high demand items to the forecasting model 502. Additionally, a prediction timeframe is also provided to the forecasting model 502. For example, the prediction timeframe may indicate a number of weeks out (e.g., within the next three weeks) that the forecasting model 502 predicts the sale of the high demand items.

In example embodiments, the forecasting model 502 predicts a probability or probabilistic range of predicted sales including a predicted sale volume and predicted sale price for each of the high demand items (predicted items 514). Example predicted items in the form of a table 516 are shown in FIG. 5. As shown, the table 516 includes a predicted timeframe (date 518) of when a corresponding item that is identified by a product identify (product_id 520) should be listed for sale. The table 516 also includes a volume of items predicted to sell (sale_count 522) and an average price (ave_price 524) that the item should sell for during the predicted timeframe. Finally, the probability 526 for the item selling during the predicted timeframe is provided.

The probabilities and corresponding derived information (e.g., date, sales count, average price) are then provided to the analysis engine 322 of FIG. 3 for further analysis. The analysis engine 322 is configured to identify items that have a potential inventory gap on the network system 102 with a high sale probability and price margin. In example embodiments, the analysis engine 322 first identifies items having a high probability for sale. Here, the analysis engine 322 identifies items that satisfy a probability threshold. In one embodiment, the probability threshold is 0.75. The probability threshold is tunable (e.g., by the seller) and can comprise any value for the probability threshold. If the seller adjusts the probability threshold, then the adjustment may be stored as a preference to the seller's user account.

Figure 6:
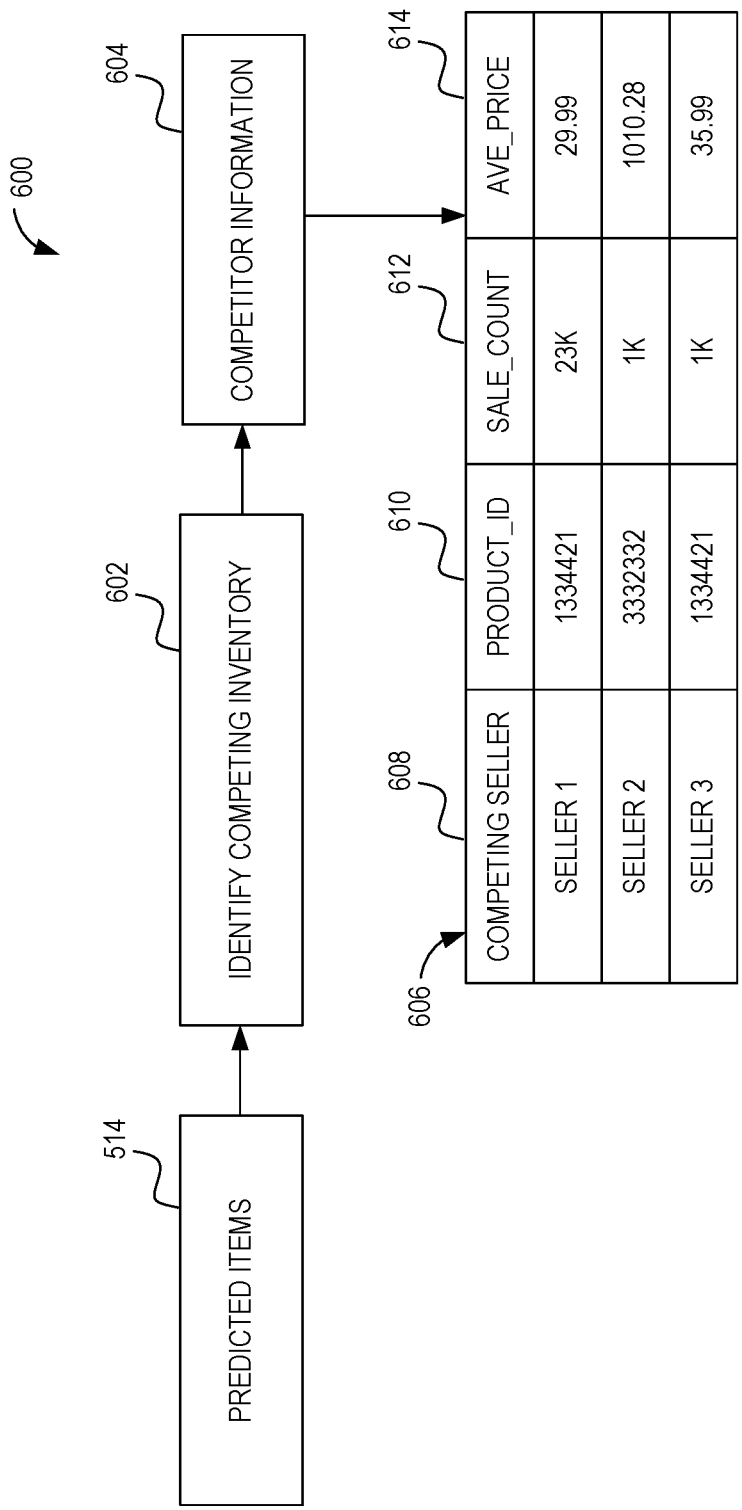
FIG. 6 is a diagram illustrating operations for identifying competitor information, according to example embodiments.

Once the high probability items are identified, the analysis engine 322 cross-checks current inventory on the site (e.g., network system 102) to identify potential inventory gaps. Referring now to FIG. 6, a diagram illustrating identification of competitor information, according to example embodiments, is illustrated. Based on the predicted items 514, the analysis engine 322 identifies current competing inventory 602 on the site. In determining the current competing inventory 602, the analysis engine 322 looks for items (and item listings) for sale that is the same as one of the predicted items 514. Once the competing inventory 602 is identified, the analysis engine 322 can identify corresponding competitor information 604 for the sellers of the competing inventory 602.

FIG. 6 shows the competitor information 604 organized into a table 606. The table 606 includes an identifier of a (potential) competing seller 608 and a product identify (product_id 610) of the item the competing seller 608 is selling. The table 606 also includes a number of units of the item (sale_count 612) that the competing seller 608 has actively listed on the network system 102 along with an average price (ave_price 614) that the item is listed for by the competing seller 608.

Based on the competitor information 604, the analysis engine 322 aggregates the number of units for each same item to derive an inventory volume for the item on the site. The analysis engine 322 also averages the sale price (e.g., average price from each competing seller for the same item) for each item. Based on the inventory volume, the analysis engine 322 determines whether the inventory volume is less then the predicted sale volume (sale_count 522) resulting in an inventory gap.

For items associated with a potential inventory gap, the analysis engine 322 identifies items that satisfy a default (or seller set) price margin threshold and/or a default (or seller set) inventory count threshold, in some embodiments. For example, if a price margin is below a price margin threshold, the analysis engine 322 may not recommend selling the item. The thresholds are included to prevent runaway conditions where, for example, the automated system lists at lower prices than the seller can allow or with a large inventory count which the seller does not have the investments for. For instance, if the average sale price on the site is $100 and the predicted sale price is $97, a price margin threshold of 4% (e.g., $96) cannot be satisfied because it is below the predicted sale price. The margin is calculated against the current avg. sale price on site, lower bounded by the predicted sale price. For the items to be listed, the condition of predicted_sale_price less than or equal to the difference of site_avg_sale_price—(price_margin*onsite_avg_sale_price) should be satisfied. In the above example, predicted_sale_price of $97 is greater than $96 calculated from [100–(0.04×100)].

As another example, if the gap in inventory count is below an inventory count threshold, the analysis engine 322 may not recommend selling the item. For instance, if the inventory volume on the site is 9,800 and the predicted sale volume is 10,000, the difference of 200 units (or 2% of the predicted sale volume) is below a default inventory count threshold of 20% of the potential predicted sale opportunity. Thus, in some embodiments, both a price margin threshold and an inventory count threshold needs to be met in order for the system to recommend selling the item. In further embodiments, there can be minimum and maximum thresholds for price margin and/or inventory volumes as well.

Items associated with an inventory gap that satisfies the demand threshold can then be presented as recommendations in a dashboard in a user interface by the user interface module 306. Referring now to FIG. 7, a dashboard user interface 700 providing potential sales opportunities and including adjustable listing thresholds that trigger automatic listing creation is shown. The dashboard user interface 700 displays aggregated competitor information for each recommended item. As such, the dashboard user interface 700 includes, for each item, a product name 702, an average sale price of competitors 704, an amount of current inventory for sale on the network system 102 (inventory volume 706), a predicted sale price 708, and a predicted sales volume 710. The product name is a name of the item identified with potential for sale. The average sales price 704 comprises a current average sale price of the item based on active listings and inventory in the network system 102 (onsite_aver_sale_price) that is determined by the analysis engine 322. The inventory volume 706 is a current volume of active inventory listed on the network system 102 for that item as determined by the analysis engine 322. The predicted sale price 708 comprises an average sale price that is predicted by the forecasting model (predicted_sale_price). The predicted sale volume 710 is a sale volume predicted by the forecasting model.

The dashboard user interface 700 also includes editable fields displaying automatic listing thresholds include price margin fields 712 and inventory count fields 714. Each price margin fields 712 provides a price margin threshold (price_margin). The price margin threshold used for automatic listing may be the same as the price margin threshold used to determine whether to present the recommendation. The price margin (or price margin threshold) is a price difference that the seller is willing to give up to be competitive. The price margin threshold is selected automatically by the analysis engine 322 to price the item competitively. In one embodiment, the price margin threshold is less than 4%, but can be adjusted by the seller to be more competitive. The price margin threshold is calculated against the current onsite average sale price 704, lower bounded by the predicted sale price 708. That is, for example, [predicted_sale_price<=onsite_aver_sale_price−(price_margin*onsite_ave_sale_price)]. In other words, any forecast (e.g., predicted sale price of $93) that is less than a price margin amount (e.g., $100−(0.04×$100) or $96) will be listed and, in example embodiments, will be listed at the price margin amount (e.g., $96).

Each inventory count fields 714 provides an inventory count or inventory count threshold (inventory count). The inventory count threshold used for automatic listing may be the same as the inventory count threshold used to determine whether to present the recommendation. The inventory count is the number of units that the seller is willing to automatically list. The inventory count is selected automatically by the analysis engine 322 to list the item competitively and is based on the predicted sale. In one embodiment, the inventory count threshold is 20% of the potential predicted sale opportunity but can be adjusted by the seller to be more competitive. The potential predicted sales opportunity (PPSO) is computed as a difference between the predicted sale volume 710 and onsite inventory volume 706, which is then bounded to 20%. That is, for example, [inventory count=20% (predicted sale volume−onsite inventory volume)]. As such, the analysis engine 322 can use the current competitor inventory to dynamically adjust the automatic listing inventory of the seller (e.g., the inventory count).

In some cases, the seller can pre-customize their price margin threshold and inventory count threshold to drive more conservative or aggressive sales based on their own risk analysis. The pre-customized thresholds can be stored to the seller's user account and used to determine whether to present the sales opportunity to the seller.

Finally, seller opt-in options 716 are included that allow the seller to opt into automatic listing creation and publication. Based on the seller opt-in option, the listing can be automatically created (by the listing generator 202) and automatically published (by the publication engine 204) to the marketplace at the appropriate time (e.g., seller opt-in is auto) or the listing can be automatically created and provided to the seller for manual approval for publication to the marketplace (e.g., seller opt-in is manual). In some cases, the automatic publication is based on a future stocking timeframe (e.g., based on handling/business days of the seller). The automatic creation of the listing is triggered when both the price margin threshold and the inventory count threshold are satisfied. The seller can change their opt-in preference anytime prior to the automatic creation of the listing.

Referring back to FIG. 3, the notification module 308 is configured to provide notifications to the seller. In some cases, the notification can indicate that a listing is scheduled to be automatically created and published. In these cases, the notification also includes inventory stocking instructions (e.g., to stock enough inventory to cover the automatically created listings). In other cases, the notification can indicate that a listing has been automatically created but needs manual approval. Here, the seller is presented the listing and can adjust the listing, adjust the inventory for sale, or reject publishing the listing.

Since multiple sellers may be utilizing the network system 102 to identify items to sell, the average sale price and onsite inventory volume are computed (e.g., in real-time) and includes future scheduled inventory (e.g., based on future automatically created listings). If the predicted sale volume is reached, the network system 102 will no longer show that sale opportunity unless the future inventory onsite goes lower than the predicted sales volume.

As an example, assume a seller specializes in cell phone accessories such as headphones and charging cables. The seller performs analysis (e.g., submit analytic queries) for sales of cell phone covers as a potential future sales item. This analysis can be detected via custom preferences or previous analytic queries by network system 102. During an inference phase, an item category of "cell phone covers" is selected as a potential category of interest for the seller by the category module 316.

Assuming it is December and given the potential category of "cell phone covers," the demand module 318 predicts, based on buyer demand data for December and search traffic, that sales of holiday themed cell phone covers will spike in the next few days. The high demand item of "holiday themed cell phone covers" is then applied, by the forecasting module 320, to the forecasting model. The forecasting model produces an output for the holiday themed cell phone cover that includes a high probability (e.g., 0.93), a high sale volume (e.g., 200 k), and an average sale price (e.g., $25.99). Here the probability satisfies a probability threshold (e.g., 0.75).

The analysis engine 322 next determines if there is a potential inventory gap for holiday themed cell phone covers by cross-checking current inventory of holiday themed cell phone covers for sale on the network system 102. For example, the active inventory currently available on site is around 190 k with an average sale price of $27.99. Thus, there appears to be a sales opportunity here.

The user interface module 306 generates and causes presentation of a dashboard to the seller. In one embodiment the dashboard indicates the recommended item (e.g., holiday themed cell phone covers), an average sales price for the item (e.g., $27.99), current inventory on site (e.g., 190 k), a predicted sale price ($25.99), a predicted sale volume (e.g., 200 k). The dashboard also includes a price margin (e.g., default of 4% or user adjusted to a different value), an inventory count (e.g., default of 20% of the potential predicted sale opportunity or user adjusted to a different value). The predicted sale price is determined by the equation: average sale price x (1.0−price margin). Assuming the default price margin of 4%, the predicted sale price in this example is $27.99×(1.0-0.04)=$26.87. The inventory count is determined as (200 k−190 k)×0.20=2000 units.

If the seller has previously opted-in to automatic listing creation and publication as part of their preferences, the opt-in option will be marked as "auto." The seller can change their opt-in option to manual on the dashboard. Assuming auto opt-in, automatic listing generation and publication of the listing is scheduled (e.g., instructions sent by the analysis engine 322 to the listing generator 202) for three days from today which is based on the seller's business handling preferences. Additionally, a notification is sent, by the notification module 308 to the seller, with inventory stocking instructions.

Figure 8:
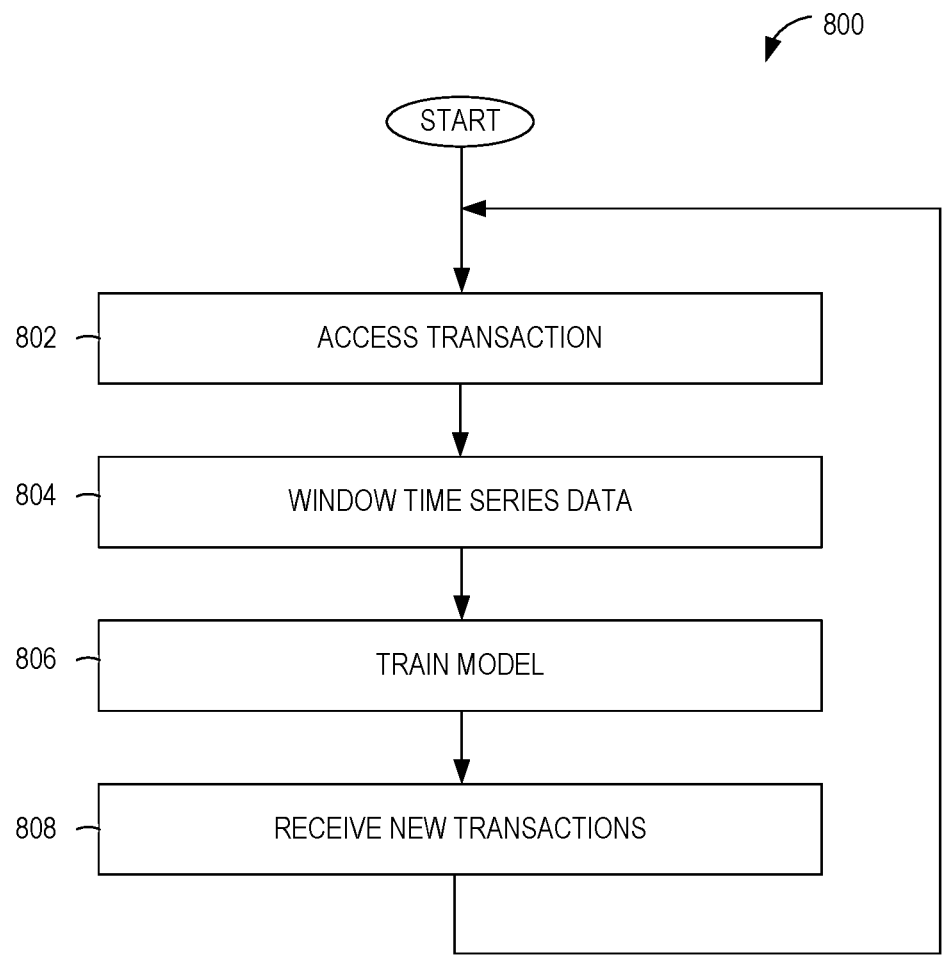
FIG. 8 is a flowchart illustrating operations of a method to train a forecasting model, according to example embodiments.

FIG. 8 is a flowchart illustrating operations of an example method 800 for machine-training a forecasting model.

Operations in the method 800 may be performed by the machine learning system 118 (e.g., the training component 302), using components described above with respect to FIG. 3. Accordingly, the method 800 is described by way of example with reference to the machine learning system 118. However, it shall be appreciated that at least some of the operations of the method 800 may be deployed on various other hardware configurations or be performed by similar components residing elsewhere in the network environment 100. Therefore, the method 800 is not intended to be limited to the machine learning system 118.

In operation 802, the machine learning system 118 accesses past transactions facilitated by the publication system 116. In some cases, the access module 310 accesses a data storage (e.g., data storage 122 or 210) that stores the transaction histories.

In operation 804, the training data module 312 structures the accessed data into a proper format for training the forecasting model. Accordingly, the training data module 312 extracts training data and structures the training data by windowing time series data. In one embodiment, the time series events are windowed at a daily rate to produce a table that is used to train the forecasting model. Alternative embodiments can train at other time intervals (e.g., every 12 hours, every hour). The structured training data is then passed to the training module 314 along with a prediction timeframe.

In operation 806, the forecasting model is trained by the training module 314. In example cases, the windowed time series data is provided to the training module 314. The machine learning can occur using, for example, a neural network. In one embodiment, the forecasting model is built using a Long Short-Term Memory (LSTM) based model which is trained to predict a next sequence of events. The training of the forecasting model may include training for probabilities for sale transactions.

In operation 808, new transactions are received as they are performed by the publication system 116. The new transactions may be stored to the data storage and subsequently used to retrain/refine the forecasting model. Thus, operations 802 to 808 of the method 800 are periodically repeated (e.g., hourly, daily, weekly). The retraining of the forecasting model provides for more accurate predictions and capturing of changing trends.

Figure 9:
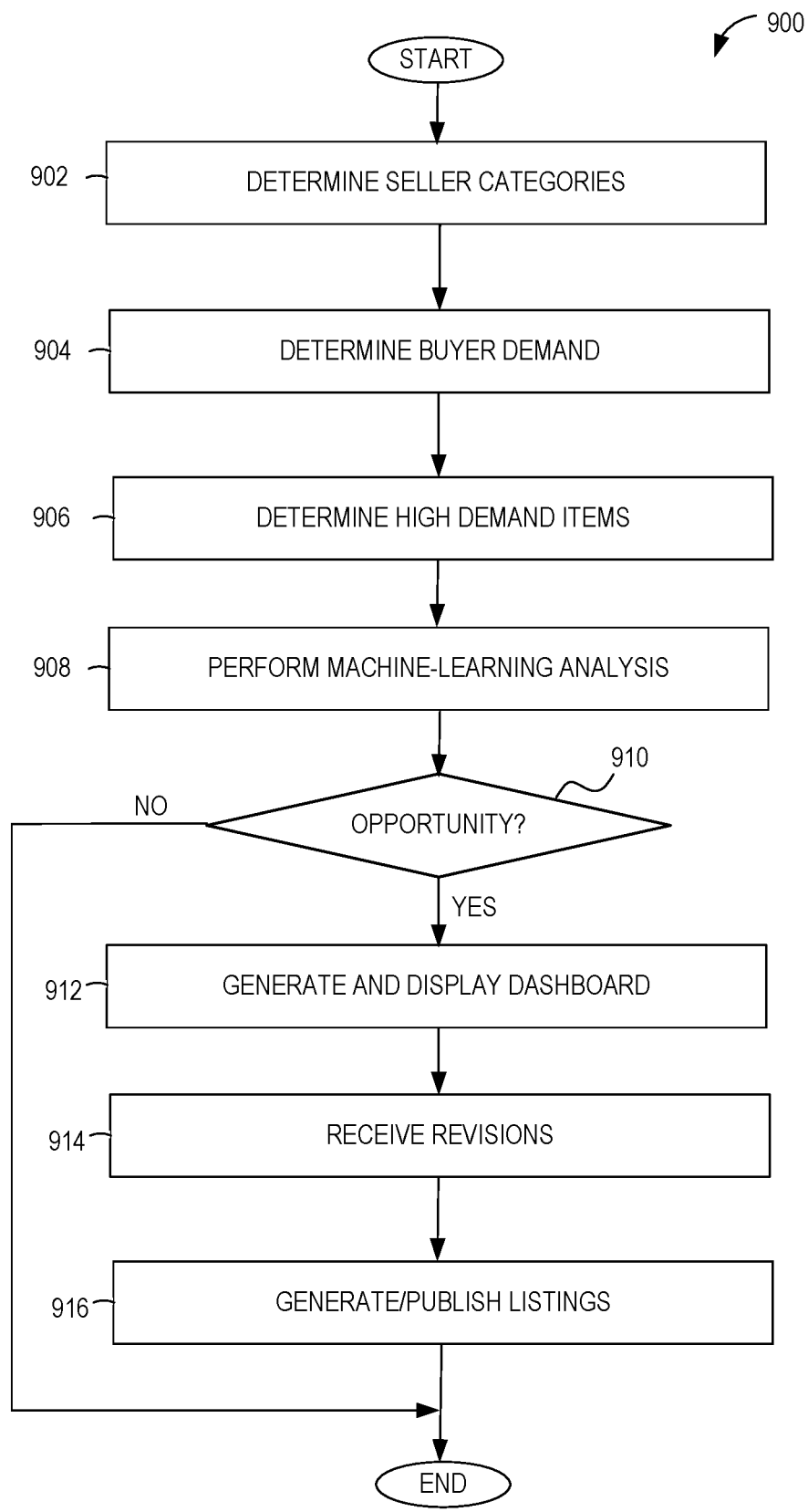
FIG. 9 is a flowchart illustrating operations of a method for automatic listing generation and inventory management based on machine-learning analysis, according to example embodiments.

FIG. 9 is a flowchart illustrating operations of an example method 900 for automatic listing generation and inventory management based on machine-learning analysis, according to example embodiments. Operations in the method 900 may be performed by the machine learning system 118, using components described above with respect to FIG. 3. Accordingly, the method 900 is described by way of example with reference to the machine learning system 118. However, it shall be appreciated that at least some of the operations of the method 900 may be deployed on various other hardware configurations or be performed by similar components residing elsewhere in the network environment 100. Therefore, the method 900 is not intended to be limited to the machine learning system 118.

In operation 902, the category module 316 determines one or more potential categories of interest for a seller. In example embodiments, the category module 316 accesses user account data for the seller (e.g., profile or account history associated with the user). Based on the user account data, the category module 316 determines current inventory of the seller (e.g., what the seller has currently listed by the publication system 116), previous analytic queries performed by the seller on the publication system 116, previous sales transactions, and any preferences of the seller. Based on the current inventory, previous analytic queries, previous sales transactions, and any preferences, the category module 316 identifies preferred categories (or leaf categories) of the seller using heuristics.

In operation 904, the demand module 318 determines recent/current buyer demand. In example embodiments, the demand module 318 accesses recent buyer demand data and search traffic. The buyer demand data comprises aggregated data of recent (e.g., last 30 days) item sales. The search traffic identifies recent search queries (e.g., for the last 30 days) and their corresponding items.

In operation 906, the demand module 318 determines high demand items. Specifically, using the buyer demand data and the search traffic, the demand module 318 determines high demand items in the potential categories identified by the category module 316 in operation 902. A list of the high demand items and a prediction timeframe are passed to the forecasting model.

In operation 908, the forecasting module 320 performs the machine-learning analysis using the forecasting model. Operation 908 will be discussed in more detail in connection with FIG. 10 below.

In operation 910, a determination is made whether there is a potential sales opportunity. In example embodiments, the analysis engine 322 determines whether there is a potential inventory gap that satisfies both a price margin threshold and an inventory count threshold. If both thresholds are satisfied, then a potential sales opportunity exists. The method 900 then proceeds to operation 912.

If there is an inventory gap, then in operation 912, the user interface module 306 generates and causes display of a dashboard user interface. In example embodiments, the dashboard user interface displays aggregated competitor information for each recommended item including a product name, an average sale price of competitors, and an amount of current inventory for sale on the network system 102. The dashboard user interface also includes a predicted sale price and a predicted sales volume for each recommended item. The dashboard user interface 700 also includes editable fields displaying automatic listing thresholds including a price margin threshold and an inventory count threshold.

In operation 914, one or more seller revisions to the editable fields may be received by the user interface module 306. For example, the seller may adjust the price margin threshold, adjust the inventory count threshold, or adjust an opt-in option (e.g., between automatic and manual). Because the seller may not make any revisions, operation 914 is optional.

Assuming the price margin threshold and inventory count thresholds are satisfied, in operation 916, the analysis engine 322 triggers the listing generation and/or publication of the listings. In cases where the seller has opted-in to automatic publication, the analysis engine 322 may send instructions to the listing generator 202 to create the listing and send instructions to the publication engine 204 to publish the listing at a determined time. The determined time may be based on stocking timeframe, based on business handling preferences, or based on prediction by the forecasting model. In cases where the seller has opted-in to manual publication, the analysis engine 322 may send instructions to the listing generator 202 to create the listing, and the listing is provided to the seller for approval.

In some embodiments, the notification module 308 provides notifications to the seller. For example, the notification can indicate that a listing is scheduled to be automatically created and published and include inventory stocking instructions. In other cases, the notification can indicate that a listing has been automatically created but needs manual approval. Here, the seller may be presented the listing, and the seller can make adjustments to the listing, adjust the inventory for sale, or reject publishing the listing.

Figure 10:
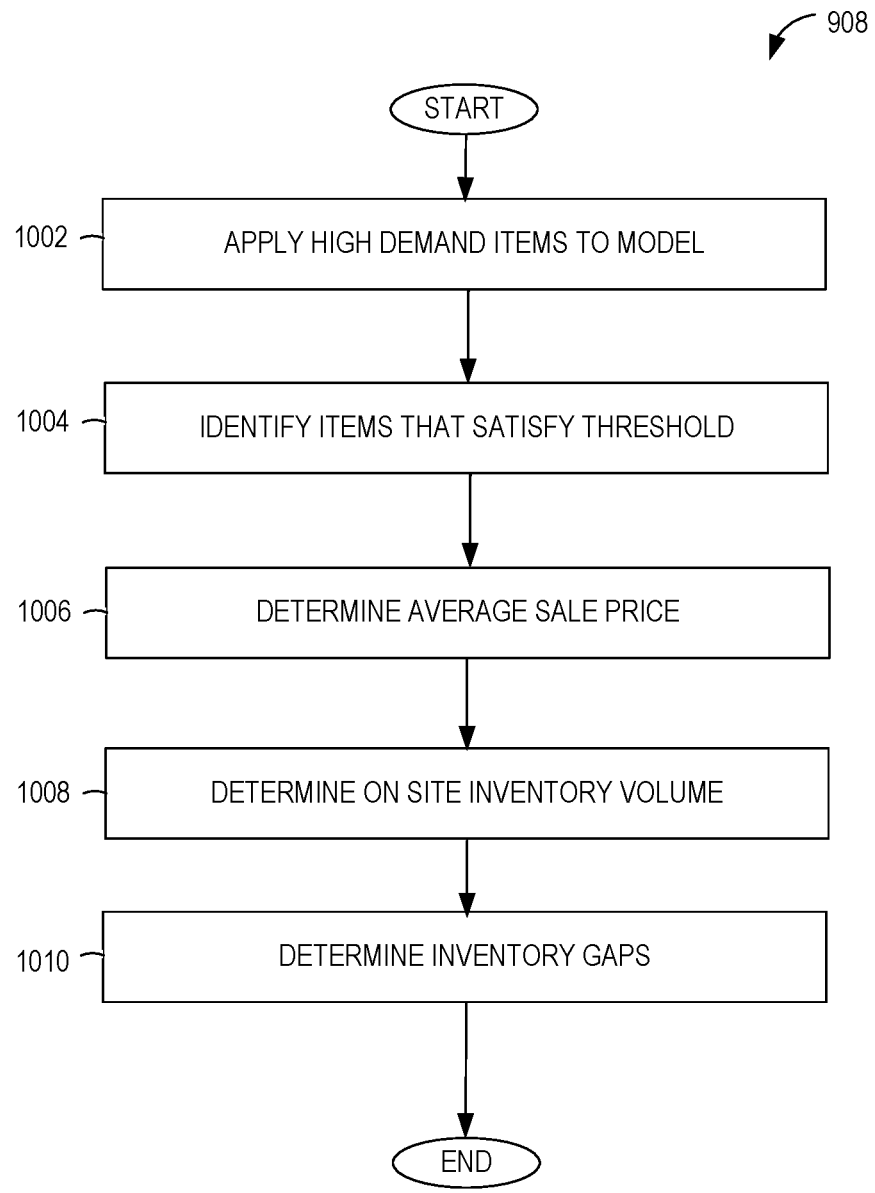
FIG. 10 is a flowchart illustrating operations of a method for performing the machine-learning analysis, according to example embodiments.

FIG. 10 is a flowchart illustrating operations of an example method (e.g., operation 908) for performing machine-learning analysis, according to example embodiments. Operations in the method may be performed by the machine learning system 118, using components described above with respect to FIG. 3. Accordingly, the method is described by way of example with reference to the machine learning system 118. However, it shall be appreciated that at least some of the operations of the method may be deployed on various other hardware configurations or be performed by similar components residing elsewhere in the network environment 100. Therefore, the method is not intended to be limited to the machine learning system 118.

In operation 1002, the forecasting module 320 applies high demand items to the forecasting model. In example embodiments, a list of the high demand items along with a prediction timeframe is passed to the forecasting module 320 which applies the list of the high demand items to the forecasting model 502. The prediction timeframe may indicate a number of days or weeks out (e.g., within the next three weeks) that the forecasting model 502 predicts the sale of the high demand items.

The forecasting model outputs probabilities of predicted sales for the different high demand items of each potential category. The forecasting model may also include corresponding predictions, such as, for example, a predicted timeframe of when a corresponding item should be listed for sale, a volume of items predicted to sell, and an average price that the item should sell for.

In operation 1004, the analysis engine 322 identifies items having probabilities that satisfy a probability threshold. In one embodiment, the probability threshold is 0.75. In some embodiments, the probability threshold is tunable (e.g., by the seller) and can comprise any value for the probability threshold. Furthermore, each item or category of items may have a different probability threshold. For example, a probability threshold may be 0.75 for a cell phone accessory category or type of cell phone accessory (e.g., holiday cell phone covers), but be 0.8 for a sports team apparel category or type of sports team apparel (e.g., football team jerseys).

Once the high probability items are identified, the analysis engine 322 cross-checks current inventory on the site (e.g., network system 102) for each high probability item to identify potential inventory gaps. Thus, the analysis engine 322 identifies current competing inventory 602 for each of these high probability items on the site (e.g., marketplace associated with the network system 102).

In operation 1006, the analysis engine 322 determines an average sale price for the competing inventory. Accordingly, the analysis engine 322 averages the sale price (e.g., average price from each competing seller for the same item) for each high probability item.

In operation 1008, the analysis engine 322 determines an inventory volume for the competing inventory. Accordingly, the analysis engine 322 aggregates the number of units of all competing inventory for each high probability item.

In operation 1010, the analysis engine 322 determines any inventory gaps. In some embodiments, the analysis engine 322 determines whether the inventory volume for a high probability item is less than the predicted sale volume that is predicted by the forecasting model.

While example embodiments are discussed whereby potential categories are determined by the category module 316 based, in part, on previous analytic queries performed by the seller and current sales, alternative embodiments may allow the seller to directly provide categories/items they are interested in selling (e.g., as part of their custom preferences). The seller can also include a desired price and volume for the categories they are interested in selling. In these embodiments, the evaluation component 304 can detect a potential average sale price and volume and can automatically list the item if the seller's desired price and volume is satisfied.

Figure 11:
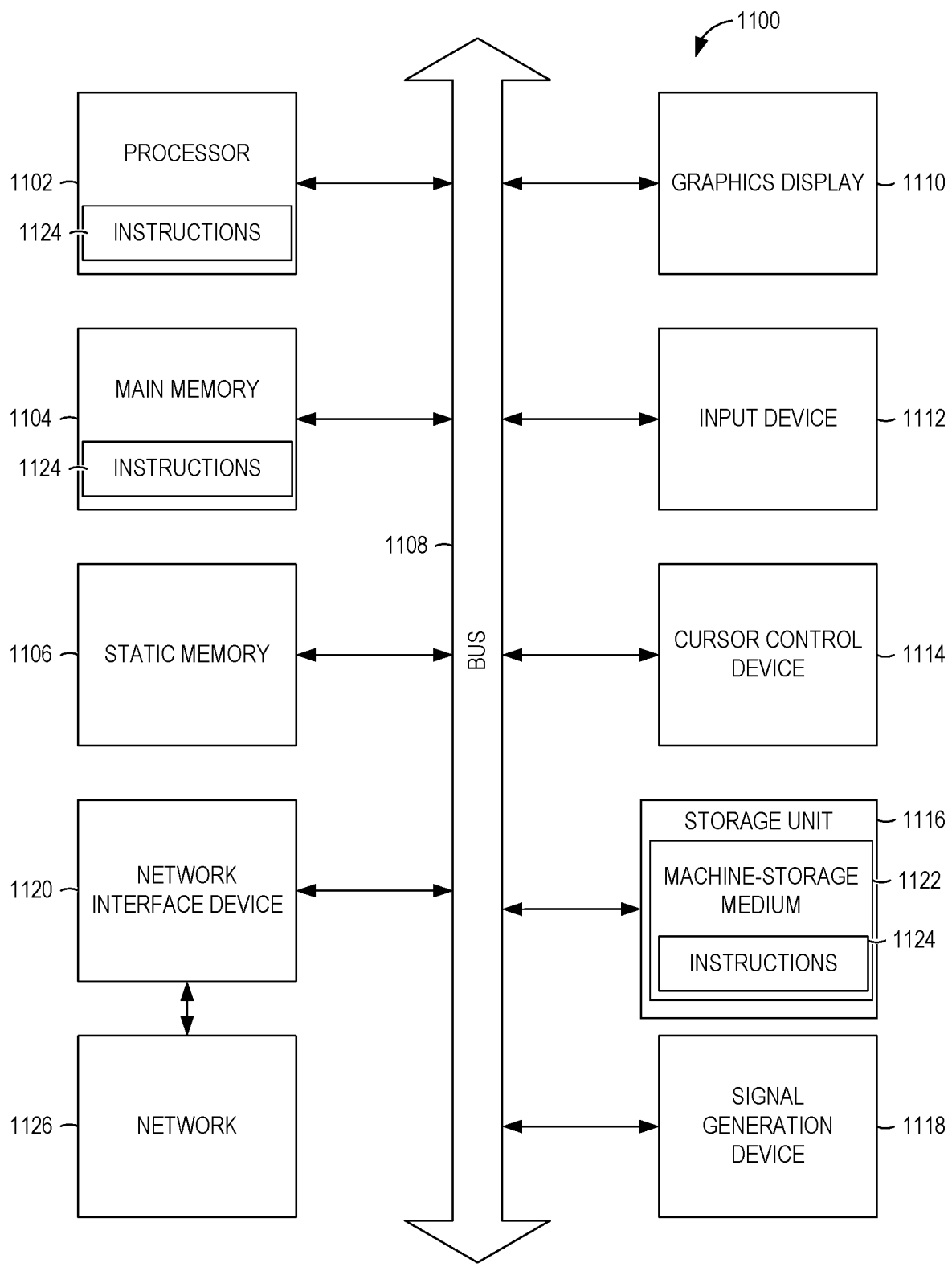
FIG. 11 is a block diagram illustrating components of a machine, according to some examples, able to read instructions from a machine-storage medium and perform any one or more of the methodologies discussed herein.

FIG. 11 illustrates components of a machine 1100, according to some examples that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 11 shows a diagrammatic representation of the machine 1100 in the example form of a computer device (e.g., a computer) and within which instructions 1124 (e.g., software, a program, an application, an applet, an app, or other executable code) for causing the machine 1100 to perform any one or more of the methodologies discussed herein may be executed, in whole or in part.

For example, the instructions 1124 may cause the machine 1100 to execute the flow diagrams of FIG. 8 to FIG. 10. In one example, the instructions 1124 can transform the general, non-programmed machine 1100 into a particular machine (e.g., specially configured machine) programmed to carry out the described and illustrated functions in the manner described.

In alternative examples, the machine 1100 operates as a standalone device or may be connected (e.g., networked) to other machines. In a networked deployment, the machine 1100 may operate in the capacity of a server machine or a client machine in a server-client network environment, or as a peer machine in a peer-to-peer (or distributed) network environment. The machine 1100 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1124 (sequentially or otherwise) that specify actions to be taken by that machine. Further, while only a single machine is illustrated, the term "machine" shall also be taken to include a collection of machines that individually or jointly execute the instructions 1124 to perform any one or more of the methodologies discussed herein.

The machine 1100 includes a processor 1102 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1104, and a static memory 1106, which are configured to communicate with one another via a bus 1108. The processor 1102 may contain microcircuits that are configurable, temporarily or permanently, by some or all of the instructions 1124 such that the processor 1102 is configurable to perform any one or more of the methodologies described herein, in whole or in part. For example, a set of one or more microcircuits of the processor 1102 may be configurable to execute one or more modules (e.g., software modules) described herein.

The machine 1100 may further include a graphics display 1110 (e.g., a plasma display panel (PDP), a light emitting diode (LED) display, a liquid crystal display (LCD), a projector, or a cathode ray tube (CRT), or any other display capable of displaying graphics or video). The machine 1100 may also include an input device 1112 (e.g., a keyboard), a cursor control device 1114 (e.g., a mouse, a touchpad, a trackball, a joystick, a motion sensor, or other pointing instrument), a storage unit 1116, a signal generation device 1118 (e.g., a sound card, an amplifier, a speaker, a headphone jack, or any suitable combination thereof), and a network interface device 1120.

The storage unit 1116 includes a machine-storage medium 1122 (e.g., a tangible machine-storage medium) on which is stored the instructions 1124 (e.g., software) embodying any one or more of the methodologies or functions described herein. The instructions 1124 may also reside, completely or at least partially, within the main memory 1104, within the processor 1102 (e.g., within the processor's cache memory), or both, before or during execution thereof by the machine 1100. Accordingly, the main memory 1104 and the processor 1102 may be considered as machine-readable media (e.g., tangible and non-transitory machine-readable media). The instructions 1124 may be transmitted or received over a network 1126 via the network interface device 1120.

In some examples, the machine 1100 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (e.g., 1104, 1106, and/or memory of the processor(s) 1102) and/or storage unit 1116 may store one or more sets of instructions and data structures (e.g., software) 1124 embodying or utilized by any one or more of the methodologies or functions described herein. These instructions, when executed by processor(s) 1102 cause various operations to implement the disclosed examples.

As used herein, the terms "machine-storage medium," "device-storage medium," "computer-storage medium" (referred to collectively as "machine-storage medium 1122") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 1122 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage medium or media, computer-storage medium or media, and device-storage medium or media 1122 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 1124 may further be transmitted or received over a communications network 1126 using a transmission medium via the network interface device 1120 and utilizing any one of a number of well-known transfer protocols (e.g., HTTP). Examples of communication networks 1126 include a local area network (LAN), a wide area network (WAN), the Internet, mobile telephone networks, plain old telephone service (POTS) networks, and wireless data networks (e.g., Wi-Fi, LTE, and WiMAX networks). The term "transmission medium" shall be taken to include any intangible medium that is capable of storing, encoding, or carrying instructions 1124 for execution by the machine 1100, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain examples are described herein as including logic or a number of components, modules, or mechanisms. Modules may constitute either software modules (e.g., code embodied on a machine-storage medium or in a transmission signal) or hardware modules. A "hardware module" is a tangible unit capable of performing certain operations and may be configured or arranged in a certain physical manner. In various examples, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some examples, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering examples in which hardware modules are temporarily configured (e.g., programmed), the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In examples in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some examples, the one or more processors or processor-implemented modules may be located in a single geographic location (e.g., within a home environment, an office environment, or a server farm). In other examples, the one or more processors or processor-implemented modules may be distributed across a number of geographic locations.

Examples

Example 1 is a method for automatic listing generation and inventory management based on machine-learning analysis. The method comprises training, by a network system, a time series-based machine learning (ML) model that forecasts sales; determining, by the network system, one or more potential categories for a user based on custom preferences and previous analytic queries of the user; applying high demand items in the one or more potential categories to the ML model, the ML model outputting probabilities of predicted sales for the high demand items in the one or more potential categories; determining, by the network system, items having a potential inventory gap by cross-checking current inventory with a list of one or more items having a probability outputted by the ML model that satisfies a probability threshold; and for each item that has a potential inventory gap, causing presentation, on a user interface, of competitor sales data, predicted sales data derived from the ML model, and editable fields displaying automatic listing thresholds that trigger the automatic generation of a corresponding listing.

In example 2, the subject matter of example 1 can optionally include wherein the editable fields include a price margin field that indicates a price margin listing threshold.

In example 3, the subject matter of any of examples 1-2 can optionally include wherein the editable fields includes an inventory count field that indicates an inventory amount listing threshold the user is willing to stock and sell.

In example 4, the subject matter of any of examples 1-3 can optionally include wherein the training the ML model comprises accessing transaction histories; and windowing time series event for a predetermined time interval; and the method further comprises retraining the ML model at the predetermined time interval.

In example 5, the subject matter of any of examples 1-4 can optionally include receiving, via one of the editable fields, an adjustment to at least one of the listing thresholds; and updating the custom preferences based on the adjustment.

In example 6, the subject matter of any of examples 1-5 can optionally include receiving, via the user interface, an indication to switch an automatic listing creation and publication opt-in option between automatic and manual; and updating the custom preferences based on the indication.

In example 7, the subject matter of any of examples 1-6 can optionally include based on the automatic listing attributes, automatically generating a listing for each item the seller opts into selling; and publishing the listing to an electronic marketplace at a time determined by the network system.

In example 8, the subject matter of any of examples 1-7 can optionally include in response to the generating of the listing, generating and transmitting a notification to the user that includes inventory stocking instructions.

In example 9, the subject matter of any of examples 1-8 can optionally include accessing updated training data including one or more of updated previous sales data; and retraining the ML model with the updated training data.

In example 10, the subject matter of any of examples 1-9 can optionally include determining the high demand items in the one or more potential categories, the determining comprising accessing buyer demand data and search traffic; and filtering the high demand items from the one or more potential categories based on the buyer demand and the search traffic.

Example 11 is a system for automatic listing generation and inventory management based on machine-learning analysis. The system comprises one or more hardware processors and a memory storing instructions that, when executed by the one or more hardware processors, cause the one or more hardware processors to perform operations comprising training a time series-based machine learning (ML) model that forecasts sales; determining one or more potential categories for a user based on custom preferences and previous analytic queries of the user; applying high demand items in the one or more potential categories to the ML model, the ML model outputting probabilities of predicted sales for the high demand items in the one or more potential categories; determining items having a potential inventory gap by cross-checking current inventory with a list of one or more items having a probability outputted by the ML model that satisfies a probability threshold; and for each item that has a potential inventory gap, causing presentation, on a user interface, of competitor sales data, predicted sales data derived from the ML model, and editable fields displaying automatic listing thresholds that trigger the automatic generation of a corresponding listing.

In example 12, the subject matter of example 11 can optionally include wherein the editable fields include a price margin field that indicates a price margin listing threshold.

In example 13, the subject matter of any of examples 11-12 can optionally include wherein the editable fields includes an inventory count field that indicates an inventory amount listing threshold the user is willing to stock and sell.

In example 14, the subject matter of any of examples 11-13 can optionally include wherein the training the ML model comprises accessing transaction histories; and windowing time series event for a predetermined time interval; and the method further comprises retraining the ML model at the predetermined time interval.

In example 15, the subject matter of any of examples 11-14 can optionally include wherein the operations further comprise receiving, via one of the editable fields, an adjustment to at least one of the listing thresholds; and updating the custom preferences based on the adjustment In example 16, the subject matter of any of examples 11-15 can optionally include wherein the operations further comprise receiving, via the user interface, an indication to switch an automatic listing creation and publication opt-in option between automatic and manual; and updating the custom preferences based on the indication.

In example 17, the subject matter of any of examples 11-16 can optionally include wherein the operations further comprise based on the automatic listing attributes, automatically generating a listing for each item the seller opts into selling; and publishing the listing to an electronic marketplace at a time determined by the network system.

In example 18, the subject matter of any of examples 11-17 can optionally include wherein the operations further comprise in response to the generating of the listing, generating and transmitting a notification to the user that includes inventory stocking instructions.

In example 19, the subject matter of any of examples 11-18 can optionally include wherein the operations further comprise determining the high demand items in the one or more potential categories, the determining comprising accessing buyer demand data and search traffic; and filtering the high demand items from the one or more potential categories based on the buyer demand and the search traffic.

Example 20 is a computer-storage medium comprising instructions which, when executed by one or more hardware processors of a machine, cause the machine to perform operations for automatic listing generation and inventory management based on machine-learning analysis. The operations comprise training a time series-based machine learning (ML) model that forecasts sales; determining one or more potential categories for a user based on custom preferences and previous analytic queries of the user; applying high demand items in the one or more potential categories to the ML model, the ML model outputting probabilities of predicted sales for the high demand items in the one or more potential categories; determining items having a potential inventory gap by cross-checking current inventory with a list of one or more items having a probability outputted by the ML model that satisfies a probability threshold; and for each item that has a potential inventory gap, causing presentation, on a user interface, of competitor sales data, predicted sales data derived from the ML model, and editable fields displaying automatic listing thresholds that trigger the automatic generation of a corresponding listing.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific examples, various modifications and changes may be made to these examples without departing from the broader scope of examples of the present invention. For instance, various examples or features thereof may be mixed and matched or made optional by a person of ordinary skill in the art. Such examples of the present subject matter may be referred to herein, individually or collectively, by the term "invention" merely for convenience and without intending to voluntarily limit the scope of this application to any single invention or present concept if more than one is, in fact, disclosed.

The examples illustrated herein are believed to be described in sufficient detail to enable those skilled in the art to practice the teachings disclosed. Other examples may be used and derived therefrom, such that structural and logical substitutions and changes may be made without departing from the scope of this disclosure. The Detailed Description, therefore, is not to be taken in a limiting sense, and the scope of various examples is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various examples of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of examples of the present invention as represented by the appended claims. The specification and drawings are, accordingly, to be regarded in an illustrative rather than a restrictive sense.

What is claimed is:

1. A method comprising:
   training, by a training component of a machine learning system on a first server, a time series-based machine learning (ML) model that forecasts sales based on stored transaction histories;
   determining, by an evaluation component of the machine learning system, one or more potential categories for a user based on custom preferences and previous analytic queries of the user;
   applying, by the evaluation component, high demand items in the one or more potential categories to the ML model, the ML model outputting a predicted sales count and a probability of predicted sales for each of the high demand items in the one or more potential categories;
   determining, by the evaluation component, items having a potential inventory gap by cross-checking current inventory with a list of one or more items having a probability outputted by the ML model that satisfies a probability threshold;
   for each item that has a potential inventory gap, causing presentation, on a user interface, of competitor sales data, the predicted sales count and the probability derived from the ML model, and editable fields displaying automatic listing thresholds that trigger automatic generation of a corresponding listing;
   based on the automatic listing thresholds being satisfied, triggering, by the evaluation component, a listing generator of a publication system on a second server to automatically generate the corresponding listing;
   continually storing new transactions, the new transactions indicating an actual sales count;
   retraining the ML model based on the new transactions and the actual sales count to account for ongoing trends;
   validating, by the evaluation component, predictive accuracy of the ML model by comparing a predicted sales count outputted by the ML model with the actual sales count; and
   tuning, by the evaluation component, one or more hyperparameters of the ML model based on the validating to improve generalization and the predictive accuracy of the ML model.

2. The method of claim 1, wherein the editable fields include a price margin field that indicates a price margin listing threshold.

3. The method of claim 1, wherein the editable fields includes an inventory count field that indicates an inventory amount listing threshold the user is willing to stock and sell.

4. The method of claim 1, wherein:
   the training the ML model comprises:
      accessing the transaction histories; and
      windowing time series events for a predetermined time interval; and
   the retraining the ML model occurs at the predetermined time interval.

5. The method of claim 1, further comprising:
   receiving, via one of the editable fields, an adjustment to at least one of the automatic listing thresholds; and
   updating the custom preferences based on the adjustment.

6. The method of claim 1, further comprising:
   receiving, via the user interface, an indication to switch an automatic listing creation and publication opt-in option between automatic and manual; and
   updating the custom preferences based on the indication.

7. The method of claim 1, further comprising:
   automatically publishing, by the publication system, the corresponding listing to an electronic marketplace at a time determined by the machine learning system.

8. The method of claim 1, further comprising:
   in response to generating the corresponding listing, generating and transmitting a notification to the user that includes inventory stocking instructions.

9. The method of claim 1, further comprising:
   accessing updated search traffic, wherein the retraining the ML model is further based on the updated search traffic.

10. The method of claim 1, further comprising:
    determining the high demand items in the one or more potential categories, the determining the high demand items comprising:

accessing buyer demand data and search traffic; and filtering the high demand items from the one or more potential categories based on the buyer demand data and the search traffic.

11. A system comprising:

one or more hardware processors; and a memory storing instructions that, when executed by the one or more hardware processors, cause the one or more hardware processors to perform operations comprising:

training, by a machine learning system on a first server, a time series-based machine learning (ML) model that forecasts sales based on stored transaction histories, determining, by the machine learning system, one or more potential categories for a user based on custom preferences and previous analytic queries of the user;

applying, by the machine learning system, high demand items in the one or more potential categories to the ML model, the ML model outputting a predicted sales count and a probability of predicted sales for each of the high demand items in the one or more potential categories;

determining, by the machine learning system, items having a potential inventory gap by cross-checking current inventory with a list of one or more items having a probability outputted by the ML model that satisfies a probability threshold;

for each item that has a potential inventory gap, causing presentation, on a user interface, of competitor sales data, the predicted sales count and the probability derived from the ML model, and editable fields displaying automatic listing thresholds that trigger automatic generation of a corresponding listing;

based on the automatic listing thresholds being satisfied, triggering, by the machine learning system, a publication system on a second server to automatically generate the corresponding listing;

continually storing new transactions, the new transactions indicating an actual sales count;

retraining the ML model based on the new transactions and the actual sales count to account for ongoing trends;

validating predictive accuracy of the ML model by comparing a predicted sales count outputted by the ML model with the actual sales count; and tuning one or more hyperparameters of the ML model based on the validating to improve generalization and the predictive accuracy of the ML model.

12. The system of claim 11, wherein the editable fields include a price margin field that indicates a price margin listing threshold.

13. The system of claim 11, wherein the editable fields includes an inventory count field that indicates an inventory amount listing threshold the user is willing to stock and sell.

14. The system of claim 11, wherein:

the training the ML model comprises:

accessing the transaction histories; and windowing time series events for a predetermined time interval; and the retraining the ML model occurs at the predetermined time interval.

15. The system of claim 11, wherein the operations further comprise:

receiving, via one of the editable fields, an adjustment to at least one of the automatic listing thresholds; and updating the custom preferences based on the adjustment.

16. The system of claim 11, wherein the operations further comprise:

receiving, via the user interface, an indication to switch an automatic listing creation and publication opt-in option between automatic and manual; and updating the custom preferences based on the indication.

17. The system of claim 11, wherein the operations further comprise:

automatically publishing, by the publication system, the corresponding listing to an electronic marketplace at a time determined by the machine learning system.

18. The system of claim 11, wherein the operations further comprise:

in response to generating the corresponding listing, generating and transmitting a notification to the user that includes inventory stocking instructions.

19. The system of claim 11, wherein the operations further comprise:

determining the high demand items in the one or more potential categories, the determining the high demand items comprising:

accessing buyer demand data and search traffic; and filtering the high demand items from the one or more potential categories based on the buyer demand data and the search traffic.

20. A machine-storage medium comprising instructions which, when executed by one or more hardware processors of a machine, cause the machine to perform operations comprising:

training, by a machine learning system on a first server, a time series-based machine learning (ML) model that forecasts sales based on stored transaction histories;

determining, by the machine learning system, one or more potential categories for a user based on custom preferences and previous analytic queries of the user;

applying, by the machine learning system, high demand items in the one or more potential categories to the ML model, the ML model outputting a predicted sales count and a probability of predicted sales for each of the high demand items in the one or more potential categories;

determining, by the machine learning system, items having a potential inventory gap by cross-checking current inventory with a list of one or more items having a probability outputted by the ML model that satisfies a probability threshold;

for each item that has a potential inventory gap, causing presentation, on a user interface, of competitor sales data, the predicted sales count and the probability derived from the ML model, and editable fields displaying automatic listing thresholds that trigger automatic generation of a corresponding listing;

based on the automatic listing thresholds being satisfied, triggering, by the machine learning system, a publication system on a second server to automatically generate the corresponding listing;

continually storing new transactions, the new transactions indicating an actual sales count;

retraining the ML model based on the new transactions and the actual sales count to account for ongoing trends;

validating predictive accuracy of the ML model by comparing a predicted sales count outputted by the ML model with the actual sales count; and tuning one or more hyperparameters of the ML model based on the validating to improve generalization and the predictive accuracy of the ML model.

* * * * *